US011807588B2

(12) United States Patent
McLaughlin et al.

(10) Patent No.: US 11,807,588 B2
(45) Date of Patent: Nov. 7, 2023

(54) HYDROPHOBIC COATINGS TO IMPROVE THE PHYSICAL QUALITY PARAMETERS OF FERTILIZERS

(71) Applicant: The Mosaic Company, Plymouth, MN (US)

(72) Inventors: Michael John McLaughlin, Montacute (AU); Jozefien Louisa Elvire Degryse, Parkside (AU); Roslyn Jane Baird, Aberfoyle Park (AU); Rodrigo Coqui da Silva, Redwood Park (AU); Jerri Light, Regina (CA)

(73) Assignee: The Mosaic Company, Tampa, FL (US)

( * ) Notice: Subject to any disclaimer, the term of this patent is extended or adjusted under 35 U.S.C. 154(b) by 0 days.

(21) Appl. No.: 16/746,011

(22) Filed: Jan. 17, 2020

(65) Prior Publication Data

US 2020/0231516 A1 Jul. 23, 2020

Related U.S. Application Data

(60) Provisional application No. 62/793,582, filed on Jan. 17, 2019.

(51) Int. Cl.
*C05G 5/30* (2020.01)
*C05G 3/40* (2020.01)
(Continued)

(52) U.S. Cl.
CPC .................. *C05G 5/38* (2020.02); *C05B 1/02* (2013.01); *C05B 3/00* (2013.01); *C05B 7/00* (2013.01);
(Continued)

(58) Field of Classification Search
None
See application file for complete search history.

(56) References Cited

U.S. PATENT DOCUMENTS 3,576,613 A 4/1971 Fleming
4,185,988 A * 1/1980 Kistler .................... C05G 5/30
71/27
(Continued)

FOREIGN PATENT DOCUMENTS

CN 107667083 A 2/2018
GB 1178849 A 1/1970
(Continued)

OTHER PUBLICATIONS

Search Report and Written Opinion dated May 15, 2020 for PCT Application No. PCT/US2020/014040, 12 pages.
(Continued)

*Primary Examiner* — Wayne A Langel
(74) *Attorney, Agent, or Firm* — Patterson Thuente, P.A.

(57) ABSTRACT

A fertilizer composition including a base fertilizer granule with a hydrophobic or super-hydrophobic coating that reduces fertilizer caking and dust formation. The coating can include a roughening component, which creates micron-scale surface roughness, and a hydrophobic coating. Together, the components of the coating act to physically protect water soluble fertilizers granules from the ingress of moisture and from caking, and increase the resistance of the granules to abrasion.

16 Claims, 8 Drawing Sheets

(51) Int. Cl.
  *C05B 7/00*   (2006.01)
  *C05G 3/20*   (2020.01)
  *C05D 9/02*   (2006.01)
  *C05G 3/30*   (2020.01)
  *C05C 5/00*   (2006.01)
  *C05C 9/00*   (2006.01)
  *C05D 9/00*   (2006.01)
  *C05D 1/00*   (2006.01)
  *C05B 1/02*   (2006.01)
  *C05B 3/00*   (2006.01)

(52) U.S. Cl.
  CPC ............... *C05C 5/00* (2013.01); *C05C 9/005* (2013.01); *C05D 1/00* (2013.01); *C05D 9/00* (2013.01); *C05D 9/02* (2013.01); *C05G 3/20* (2020.02); *C05G 3/30* (2020.02); *C05G 3/44* (2020.02); *C05G 5/30* (2020.02)

(56) References Cited

U.S. PATENT DOCUMENTS

| | | | |
|---|---|---|---|
| 4,857,098 A | | 8/1989 | Shirley, Jr. |
| 5,152,821 A * | 10/1992 | Walter | ............ C05G 5/36 71/33 |
| 5,560,768 A * | 10/1996 | Gordonov | ............ C05G 5/30 71/64.07 |
| 5,968,222 A * | 10/1999 | Kodali | ............ C05G 3/20 71/64.07 |
| 6,475,259 B1 * | 11/2002 | Thomas | ............ C05G 5/38 71/64.07 |
| 7,452,399 B2 | 11/2008 | Whittington | |
| 2002/0139158 A1 | 10/2002 | Hunter | |
| 2004/0074272 A1 * | 4/2004 | De Castro | ............ C05G 5/30 71/28 |
| 2005/0076687 A1 | 4/2005 | Whittington | |
| 2008/0113064 A1 * | 5/2008 | Bevans | ............ A23K 40/30 426/2 |
| 2012/0272700 A1 * | 11/2012 | Nevin | ............ C05G 5/30 71/12 |
| 2013/0055776 A1 * | 3/2013 | Schaafsma | ............ A23K 40/30 71/11 |
| 2014/0366598 A1 | 12/2014 | Carmo | |
| 2015/0376076 A1 * | 12/2015 | Ward | ............ C05B 17/00 71/23 |
| 2016/0304410 A1 * | 10/2016 | Schultz | ............ C05G 5/30 |
| 2016/0340266 A1 | 11/2016 | Jablon et al. | |
| 2018/0179117 A1 * | 6/2018 | Socolovsky | ............ C05D 9/00 |
| 2019/0276375 A1 * | 9/2019 | Mutsaers | ............ C05G 3/20 |

FOREIGN PATENT DOCUMENTS

| | | |
|---|---|---|
| GB | 1470652 A | 4/1977 |
| JP | 2000063191 A | 2/2000 |
| JP | 2002-012488 A | 1/2002 |
| JP | 2003-176194 A | 6/2003 |
| JP | 3483775 B2 | 1/2004 |
| JP | 2006-327841 A | 12/2006 |

OTHER PUBLICATIONS

International Preliminary Report on Patentability received in PCT Application No. PCT/US2020/014040 dated Jul. 29, 2021, 8 pgs.
Chinese Office Action, Chinese Application No. CN202080020203A, dated Apr. 29, 2022, 3 pages.

\* cited by examiner

HYDROPHOBIC COATINGS TO IMPROVE THE PHYSICAL QUALITY PARAMETERS OF FERTILIZERS

RELATED APPLICATION

The present application claims the benefit of U.S. Provisional Application No. 62/793,582 filed Jan. 17, 2019, which is hereby incorporated herein in its entirety by reference.

TECHNOLOGICAL FIELD

Embodiments of the present disclosure relate to a hydrophobic or super-hydrophobic coating for reducing agglomeration (caking), degradation (breakage), and dust generation of granulated fertilizers during storage, transportation, and application. Specifically, the present disclosure describes a rough coating or surface treatment with a low surface energy compound that minimizes the effect of humidity and temperature cycling of the fertilizer for the purpose of reducing agglomeration, degradation, and dust. In embodiments, the coating can be added in one step to the fertilizers, and may also contain one or more micronutrients and/or secondary nutrients, and results in free-flowing properties.

BACKGROUND

Many agricultural fertilizers are produced by granulation followed by drying and cooling before being stored for extended periods of time prior to soil application. An inherent problem during this time of conventional storage is the high propensity for a significant portion of the fertilizer to form lumps and agglomerates. The formation of hard lumps and agglomerates are generally the consequence of cyclical humidity changes with changing day to night temperatures. During increasing humidity, moisture condenses out of the air and/or moisture within granules migrates out, and the fertilizer begins to dissolve. When humidity drops and temperature cools, crystal bridges form during the process of re-crystallization, forming salt bridges that lock granules together. These lumps and agglomerates are produced in most fertilizer storage facilities.

Fertilizer which has agglomerated is more likely to produce dust when being packaged or transported due to the dislodgement of these crystals. This makes the fertilizer significantly more difficult to handle and distribute on land as the dust is prone to becoming airborne and its application is difficult to control, ultimately causing uneven nutrient distribution and potential health and safety issues for users. Where lumps of fertilizer are hard and remain unaffected by transportation, these can cause blockages in spreading equipment also resulting in uneven nutrient distribution and equipment wear.

The critical relative humidity, or CRH, at which most fertilizers absorb moisture from the air and suffer physical degradation due to caking is between 60 and 75% relative humidity (at 35° C. or 95° F.). At this humidity, moisture from the air deposits on the fertilizer and starts the surface dissolution process. When fertilizers with different CRHs are blended together, the CRH for the blend changes and is influenced by the lowest CRH component which can make the blend susceptible to caking under normal storage conditions. This can significantly limit some possible blending partners and their storage abilities.

Coating of granular fertilizers decreases the possibility of degradation. However, many of the hydrophobic coatings used on fertilizers are cost prohibitive for broad acre commercial use and so are only used in more lucrative high-value product sectors such as the turf industry, on golf courses for instance.

Steps have been taken to incorporate hydrophobic coatings onto fertilizers to significantly slow the release of nutrients from the fertilizer, thereby forming controlled- or slow-release fertilizers, such as those described in U.S. Pat. No. 7,452,399 entitled "Coating for Fertilizer," U.S. Pat. No. 4,857,098 entitled "Sulfur-Coated Fertilizer Granules and Process of Making the Same," and U.S. application Ser. No. 14/351,560 entitled "Encapsulated Nitrogen Fertilizer Composition with Fire-Extinguishing and Fire-Spreading Preventing Option Corresponding Manufacture Process and Application Process", all of which are incorporated by reference in their entireties. However, these coatings do not necessarily provide improvements to caking tendency and dust formation. Moreover, these types of coatings are often derived from synthetic polymers, which have not been tested for their long-term effects in the soil. Natural products such as waxes and oils are sometimes applied for their anti-caking abilities, such as those described in U.S. Pat. No. 6,355,083B1 entitled "Dust Control Composition for Fertilizer and Method of Treatment of Fertilizer," incorporated herein by reference in its entirety, but generally they do not provide the benefits with the longevity needed for fertilizer storage. Accordingly, these coatings can result in a significantly shortened shelf life of fertilizer and are often difficult to apply evenly to irregular surfaces.

Inert inorganic particles have been included in some coatings as fillers to try to seal the pores of macro fertilizer granules, slowing water ingress and therefore nutrient release from the product, as discussed, for example, in PCT Application Publication No. WO 2000/076649, incorporated herein by reference in its entirety. To control and slow down the nutrient release using fillers, amounts as high as 20% by weight of the coating are required, as described in, for example, European Patent Application Publication No. EP 0976699, and often the inclusion of other hydrophobic compounds such as amines are needed to slow dissolution further, as described in French Patent Application Publication No. FR 2155883A2, both of which are incorporated herein by reference in their entireties; however, this is not necessary for an anticaking coating.

As such, there is a need for an environmentally responsible and low-cost coating which reduces the caking tendency of water soluble fertilizers, especially those with irregular, angular shaped particles, such as compacted potassium chloride, which makes uniform coating otherwise difficult to achieve.

SUMMARY

Embodiments of the present disclosure are generally directed to a hydrophobic or super-hydrophobic coating for fertilizer granules. A hydrophobic coating is one in which the contact angle is 90 degrees or greater when measured from a surface, and a superhydrophobic coating is one in which the contact angle is 140 degrees or greater. Henceforth, for sake of simplicity, "hydrophobic" is used to describe a hydrophobic or super-hydrophobic state. The hydrophobic coatings of embodiments include a particulate roughening additive and a low surface energy hydrophobic component such as a coating of a wax, wax emulsion, or oil treatment agent. In embodiments of the present disclosure, the one or more additives to the hydrophobic coating result in micron scale surface roughness on the surface of the fertilizer which itself can, but not necessarily will, add hydrophobicity and/or nutrient value to the fertilizer. The hydrophobic coating over the fertilizer granule is used to protect water soluble fertilizer granules from the ingress of moisture.

In one embodiment of the disclosure, a hydrophobic coating material is in a liquid or molten state. One or more additives are then incorporated into the molten or liquid hydrophobic coating material. The hydrophobic coating material is spray coated or surface rolled onto a base fertilizer granule containing one or more primary nutrients, such as phosphorus-based, nitrogen-based, and/or potassium-based fertilizers (collectively, "NPK fertilizers"). In embodiments, suitable fertilizer granules can comprise, for example, nitrogen-containing fertilizers such as nitrates and ureas, potassium-containing fertilizers such as potashes including muriate of potash (MOP) or sulfate of potash (SOP), phosphorus-containing fertilizers such as phosphate fertilizers including ammonium phosphates like monoammonium phosphate (MAP) or diammonium phosphate (DAP), calcium phosphate fertilizers including single superphosphate (SSP) or triple superphosphate (TSP), potassium phosphates, calcium phosphates, or any combination thereof. The additives in the hydrophobic coating provide a roughness that decreases the contact area between the surface and water droplets encouraging water to run off the surface, and thus preventing or reducing water ingress.

In another embodiment of the disclosure, a fertilizer granule is first coated with a roughening material. According to this embodiment, a particulate roughening additive is first added, such as by conventional coating methods like spray coating, in either one or more continuous or discontinuous coatings around the base fertilizer granule. After the granule has been coated with a particulate roughening compound, a low energy hydrophobic material, e.g., a wax and/or oil, is then added in either one or more continuous or discontinuous coating(s) around the coated base fertilizer granule. Time between application of the roughening compound and coating can vary based on convenience of process design.

In a third embodiment, the surface roughness is the result of a physical treatment such as mechanical abrasion of the surface or by purposefully manufacturing a rough surface during base granule manufacture. One example of this would be controlling the rate of crystallization and degree of annealing of base granules to ensure the required surface roughness. Sufficient surface roughness may then only necessitate a coating of the low-energy super-hydrophobic coating, with or without additives.

In another alternative embodiment, the hydrophobic coating, with or without roughening additives, is applied to the base fertilizer granules and patterned, either upon application or subsequent application to the granule. For example, a microreplication can be formed with the coating is still in a liquid, molten, or otherwise fluid state to create a micro-roughened surface pattern.

The above summary is not intended to describe each illustrated embodiment or every implementation of the present invention. The detailed description that follows more particularly exemplifies these embodiments.

BRIEF DESCRIPTION OF THE DRAWINGS

Subject matter hereof may be more completely understood in consideration of the following detailed description of various embodiments in connection with the accompanying figures, in which.

Figure 1:
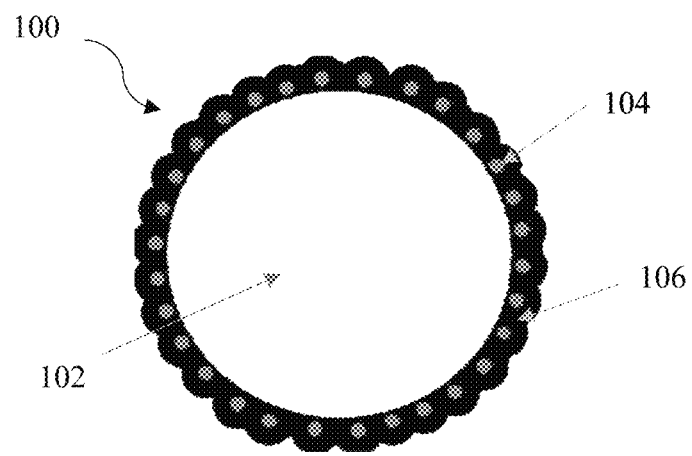
FIG. 1 is a cross-sectional view of a fertilizer granule containing a super-hydrophobic coating according to one embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

According to an embodiment of the disclosure illustrated in FIG. 1, a hydrophobic coated fertilizer granule 100 can comprise a core fertilizer portion 102 and a hydrophobic coating material 103 containing a particulate roughening additive or component 104 and a low surface energy hydrophobic material 106 coated or otherwise applied to at least a portion of fertilizer 102.

According to embodiments, fertilizer portion 102 can comprise any suitable fertilizer, such as, for example, nitrates, ureas, potashes, phosphate fertilizers such as monoammonium phosphate (MAP), diammonium phosphate (DAP), single superphosphate, triple superphosphate, potassium phosphates, calcium phosphates, or combinations thereof.

According to embodiments, hydrophobic coating material 103 can comprise a dispersion, emulsion, suspension, or mixture of a particulate roughening additive 104 or roughener in a low surface energy material 106. In embodiments, this roughening additive 104 can comprise silicates, sand, phosphate rock, calcium carbonate, gypsum, micronutrients, stearates including, for example but not limited to sodium stearate and zinc stearate, fatty acids such as stearic acid, potash dust, or any combination thereof. In alternative embodiments, any particulate crystalline or amorphous compound with solubility lower than that of a base granule may be used. In one embodiment, coating 103 comprises from about 0.01 wt % to about 10 wt %, more specifically from about 0.01 to about 5 wt %, and more specifically from about 0.1 wt % to about 1.0 wt % percent crystalline or amorphous particulate roughening additive based on the total weight of the granule. These additives may or may not be themselves hydrophobic. The roughening additive 104 can be dispersed, emulsified, or otherwise suspending in the hydrophobic material 106.

According to embodiments, the low-surface energy hydrophobic material 106 can comprise candelilla wax, beeswax, carnauba wax, waxes recycled from food industries, wax emulsions, or combinations thereof. In other embodiments, the hydrophobic material 106 can be any plant or chemical based wax with a melting point between 50° C. and about 105° C. (about 122° F. to about 221° F.). In yet another embodiment, the hydrophobic material 106 may be a wax from the petroleum industry, such as slack wax, paraffin wax, microcrystalline waxes, or combinations of oils and waxes. The combination of natural and synthetic waxes with any oil or without oil can be applied to create a hydrophobic or super-hydrophobic coating.

In yet another embodiment, the hydrophobic material 106 is comprised of any suitable natural, mineral, or synthetic oil. The oils can be any suitable natural, mineral, or synthetic oil, such as a mineral white oil but preferably a vegetable oil including canola oil, sunflower oil, soy oil, castor oil, linseed oil, olive oil, or modified vegetable oils. Other hydrophobic fatty acids such as stearic acid can also be used. In embodiments, a combination of any of wax, oil, or fatty acids can be contemplated. In embodiments, the hydrophobic wax, oil additive, or mixture of wax and oil additive coating comprises from about 0.01 to about 10 percent of the entire fertilizer granules, more particularly from about 0.1 to about 5 weight percent, and more particularly from about 0.5 to about 2.0 weight percent of the entire fertilizer granule. A thin coating ensures hydrophobicity or super-hydrophobicity while also providing the benefit of dust control, without inhibiting release of the fertilizer's nutrients once applied to the soil.

In an embodiment according to FIG. 1, a method of forming a coated fertilizer granule 100 comprises combining a predetermined quantity of a particulate roughener 104 with a predetermined quantity of hydrophobic material 106 to form a super-hydrophobic coating material for coating the formed fertilizer granule. In this embodiment, hydrophobic coating material 106 can be a liquid, solid or molten form and can be sprayed, curtain coated, or any of a number of suitable coating techniques to form a continuous or discontinuous coating onto the formed base fertilizer granules 102 to form a quantity of coated fertilizer granules 100. The granules are then dried or cooled.

Figure 2:
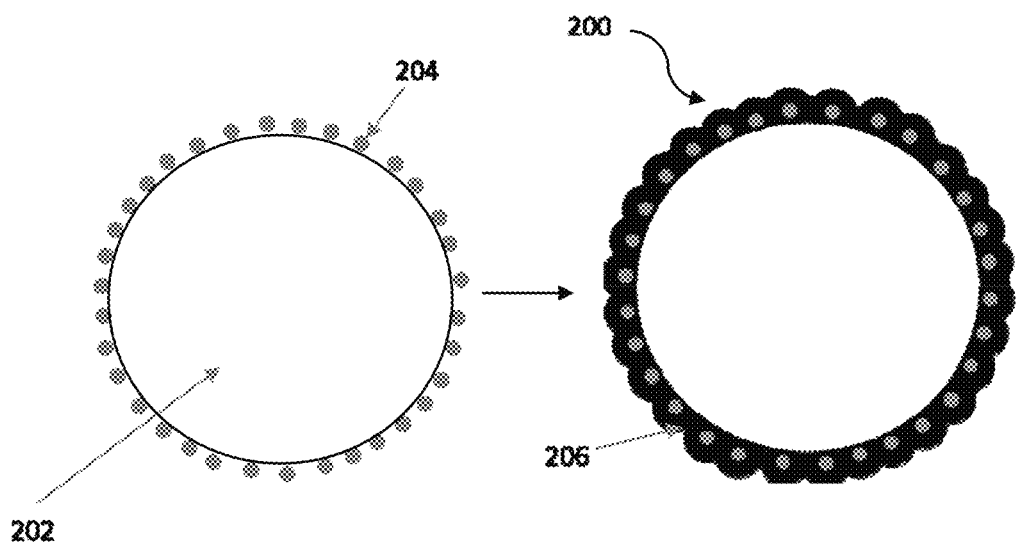
FIG. 2 is a cross-sectional view of a fertilizer granule containing a super-hydrophobic coating according to an alternative embodiment of the present invention.

In an embodiment according to FIG. 2, the particulate roughener 204 may be applied to the surface of the fertilizer granule 202, prior to application of a low energy material 206 to the fertilizer granule 202. In this embodiment, a particulate roughener 204 can be applied as a liquid, solid or melt and can be sprayed, curtain coated, or applied with any of a number of suitable coating techniques to form a continuous or discontinuous coating onto the formed fertilizer granules 202 to form a quantity of coated fertilizer granules. According to the embodiment, the particulate crystalline- or amorphous-coated granules are then coated with a low energy material 206. The low surface energy material 206 can be a liquid, solid, emulsion or molten form and can be sprayed, curtain coated, or any applied with of a number of suitable coating techniques to form a continuous or discontinuous coating onto the crystalline coated fertilizer granules to form a quantity of coated fertilizer granules 200. The granules are then dried or cooled.

Figure 3:
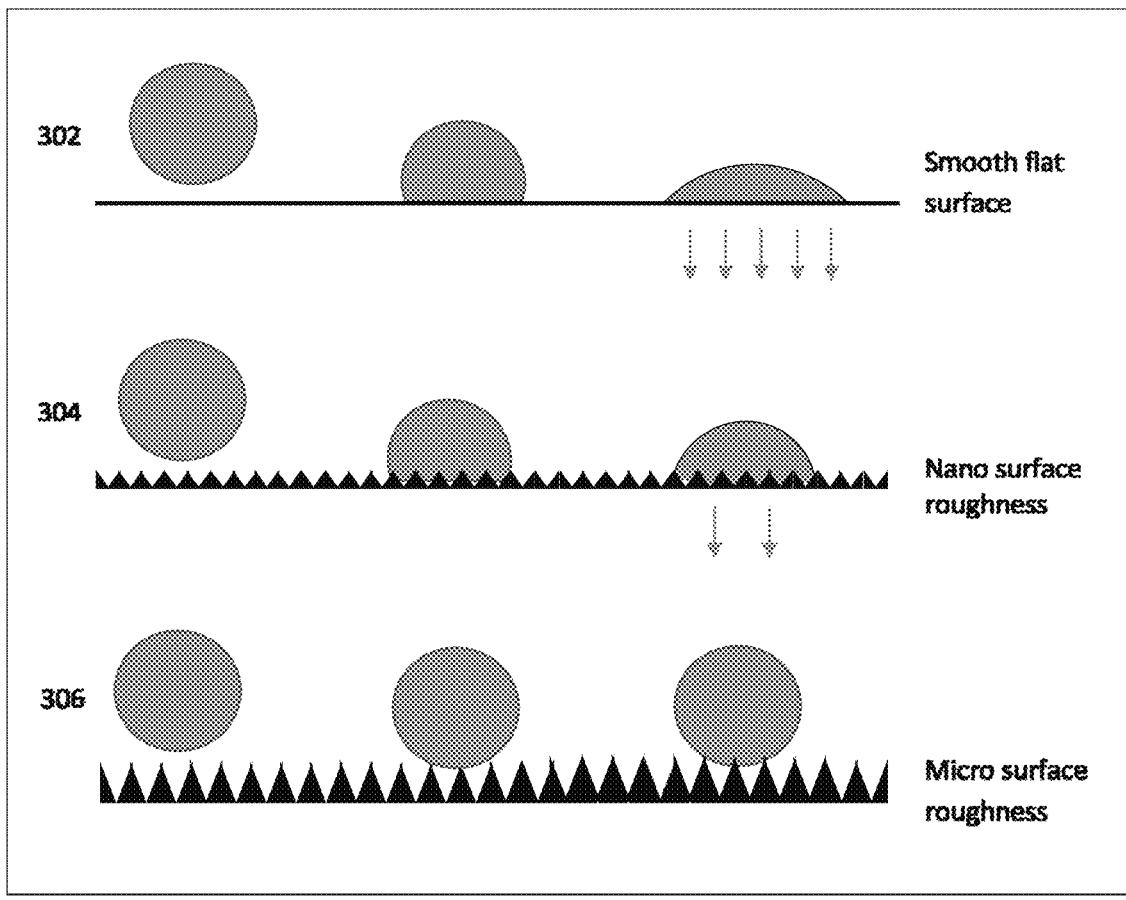
FIG. 3 is a perspective view of roughened fertilizer according to an embodiment of the present invention.

According to an embodiment of the disclosure as depicted in FIGS. 1 and 2, crystalline or amorphous particulate additives produce a micron-scale roughness on the surface of the fertilizer 104, 204. In this embodiment roughening of the fertilizer granule can be created by using a wide range of the crystalline or amorphous particulate additives previously described. The additives can have a size of about 50 nm to about 250 µm. In the most preferred embodiment these materials can have a size of about 10 µm to about 150 µm. In other embodiments the size of the additives is greater than 150 µm. According to embodiments of the disclosure illustrated in FIG. 3, micron scale surface roughness ensures that the surface areas shared by any deposited moisture droplets and the fertilizer granule 306 is minimal compared with no coating 302. The roughness ensures that water droplets remain spherical such that air trapped between the fertilizer 306 and the water droplet will not allow penetration of water into the fertilizer granule. These coatings can also be applied to granules that are heated higher than ambient temperatures to assist the surface wetting of the hydrophobic low energy coating and optimize coating homogeneity.

In embodiments, the particulate roughener compound and low energy hydrophobic additives produce a roughness that increase the hydrophobicity of the coating with minimal effect to the flowability, sprayability, or coatability of the coating. In the most preferred embodiments, the coating should be sufficiently degradable once applied to soil such that the fertilizer nutrients are readily released to the soil.

The following examples discuss particular embodiments of the invention. The equipment used in preparation of each of the examples was a SPEX Mixer Mill 8000M with shock mounted electric motor. In some examples, the mixer mill operated at an oscillating movement of 5.9 cm back and forth, and 2.5 cm side to side at 1060 cycles/min.

Example materials were prepared in batch mode by first charging vials with granules of uncoated MOP, followed by the addition of the appropriate particulate roughener materials, mixing for one minute, then heating together with the low surface energy material and mixing further whilst naturally cooling to ambient temperature.

EXAMPLE 1: MOP, MOP+WAX, AND MOP+WAX & PARTICULATE ROUGHENER

Caking of uncoated MOP was compared to MOP with a wax coating and MOP with a wax and roughener coat. The test conditions were 4 g samples subjected to 35° C. (95° F.) with 1 kg weight applied at 80% relative humidity for 7 days.

Figure 4:
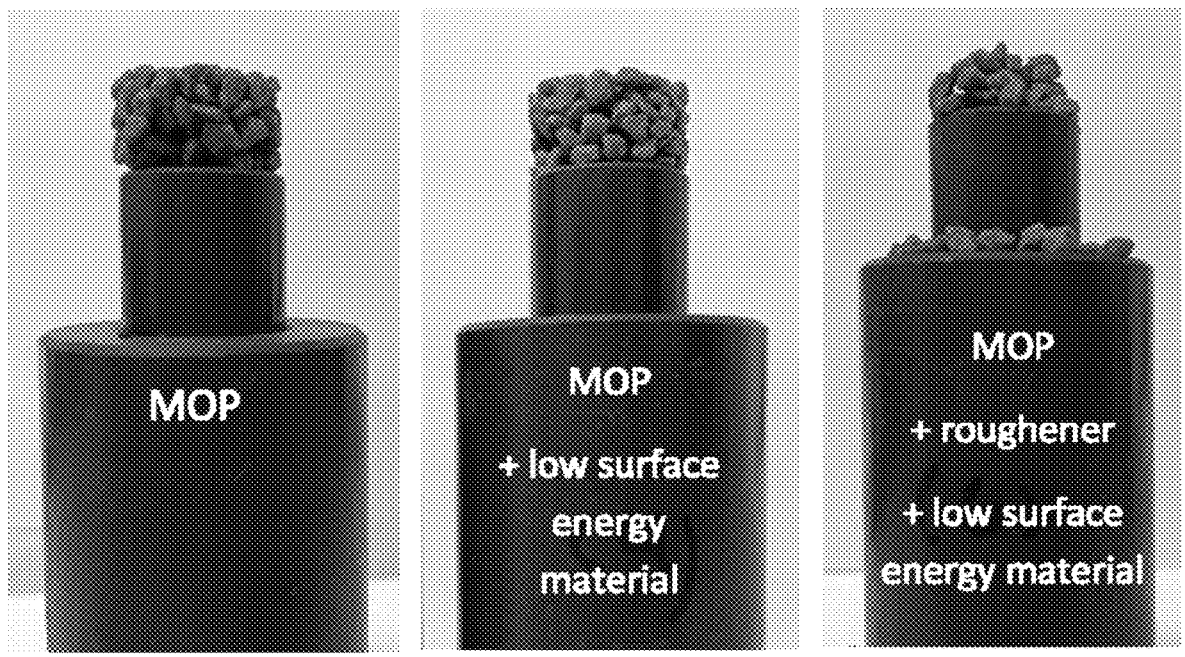
FIG. 4 is a comparison of fertilizer granules depicting the effect of various fertilizer coatings on the caking tendency of fertilizer according to embodiments of the present invention.

The caking tendency of MOP is relatively high due to the particle size distribution and angular shape of the product. In bulk storage, the caking forms as a crust on MOP stockpiles as the humidity naturally cycles. As illustrated in FIG. 4, MOP coated with finely ground phosphate rock and candelilla wax resulted in significantly less caking as compared to MOP with no surface treatment and MOP with wax only.

EXAMPLE 2: MOISTURE UPTAKE FOR MOP WITH WAX AND ROUGHENER

The moisture uptake (weight gain %) at 75% and 80% relative humidities for coated fertilizers with 1.5% candelilla wax and a range of rougheners (FIG. 5) was compared. Rougheners used in this example included phosphate rock, bentonite clay, calcium carbonate ($CaCO_3$), diatomite, elemental sulfur (El S), apatite nanoparticles ($Ca_5(PO_4)_3(F, Cl,OH)$) from SKY Spring Nanoparticles Inc, apatite nanoparticles from MK Nano, dolomite ($CaCO_3 \cdot MgCO_3$), gypsum ($CaSO_4 \cdot 2H_2O$), and zinc oxide (ZnO). The rougheners were added at rates between 0.1% (elemental S) and 2.4% (dolomite). The moisture uptake was assessed after 3 h exposure at 75 and 80% relative humidity (25° C.).

Figure 5:
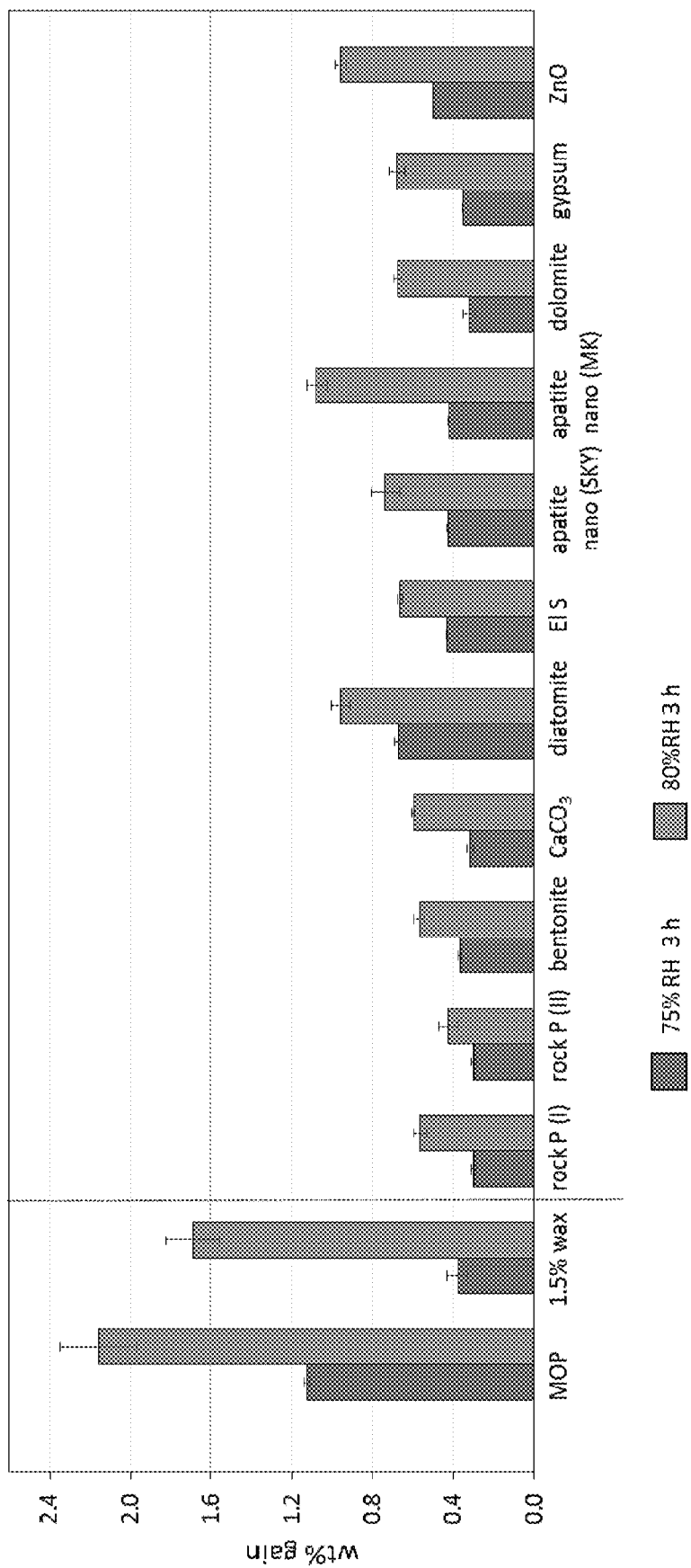
FIG. 5 is a chart comparing moisture uptake for fertilizer according to embodiments of the present invention.

As shown in the graph in FIG. 5, at 80% RH, the coated fertilizer composition using candelilla wax and rock phosphate resulted in the lowest moisture uptake.

EXAMPLE 3: CAKING TENDENCY OF MOP, MOP+ZnO IN WAX EMULSIONS AND Zn STEARATE ROUGHENER WITH CANDELILLA WAX

Figures 6A, 6B:
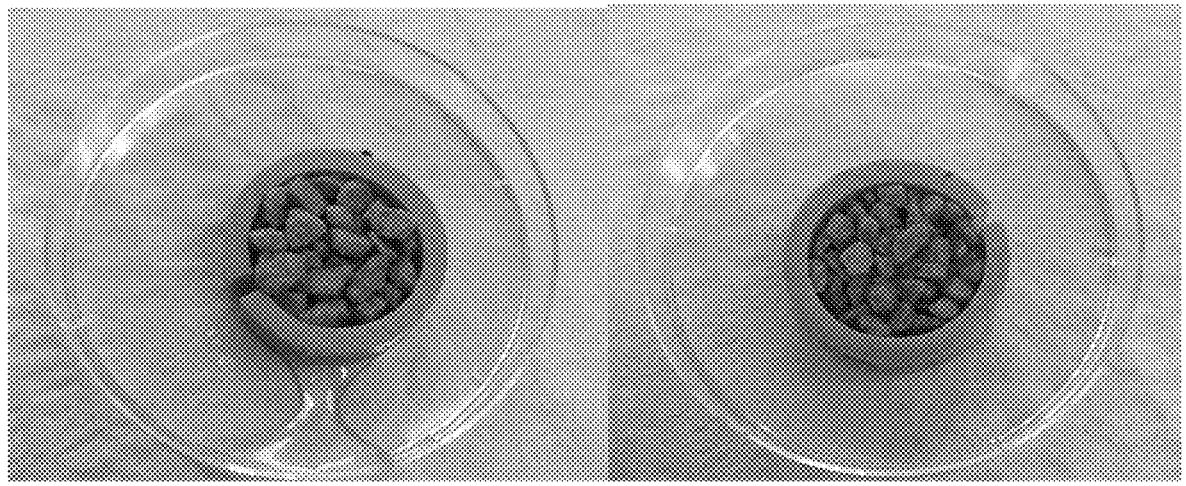
FIGS. 6A and 6B are a comparison of moisture repellence and absorption according to embodiments of the present invention.
Figure 7:
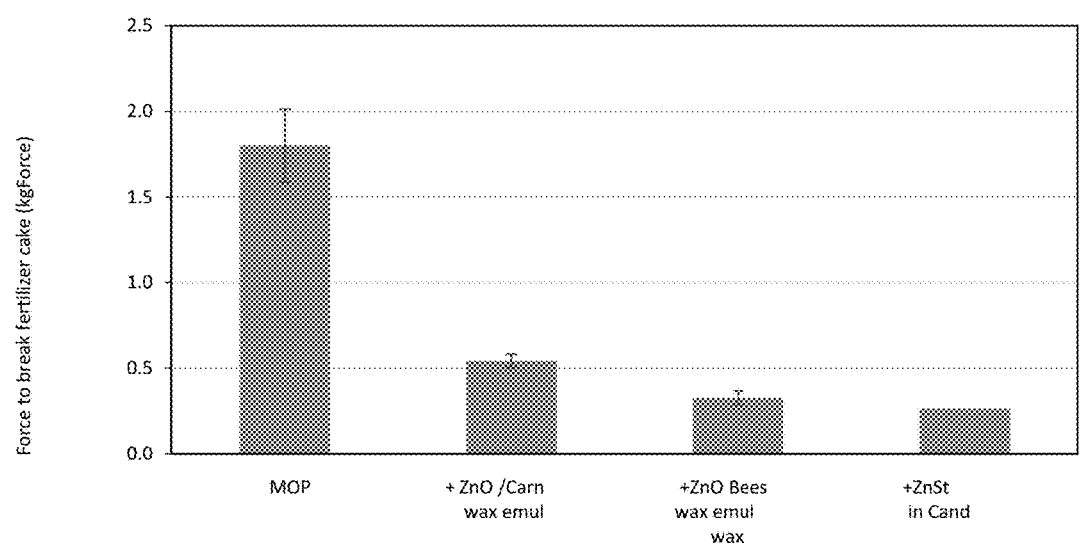
FIG. 7 is a chart comparing the caking tendency for fertilizer according to embodiments of the present invention.

In this example, MOP particles were coated with either wax emulsion coatings applied at a rate of 1.5% wt on the fertilizer with 0.5% wt Zn from ZnO, or a Zn stearate/candelilla coating. Referring to FIGS. 6A and 6B, after 15 days at 80% RH, moisture is repelled from the coated fertilizer composition (see FIG. 6A), but is absorbed by the MOP uncoated particles (see FIG. 6B). The force required to break ~3 g samples of caked fertilizer after being subjected to 80% RH at 22° C. for 30 d, followed by drying overnight at 40° C. and equilibrated to ambient temperature is shown in FIG. 7. As shown, the rougheners of ZnO and Zn stearate in either wax emulsion or melts both significantly reduced the caking tendency of uncoated MOP.

EXAMPLE 4: ABRASION RESISTANCE OVER TIME FOR MOP AND MOP COATED WITH ZnO AND WAX EMULSIONS CONTAINING VARYING RATIOS AND WAX SOURCES

Figure 8:
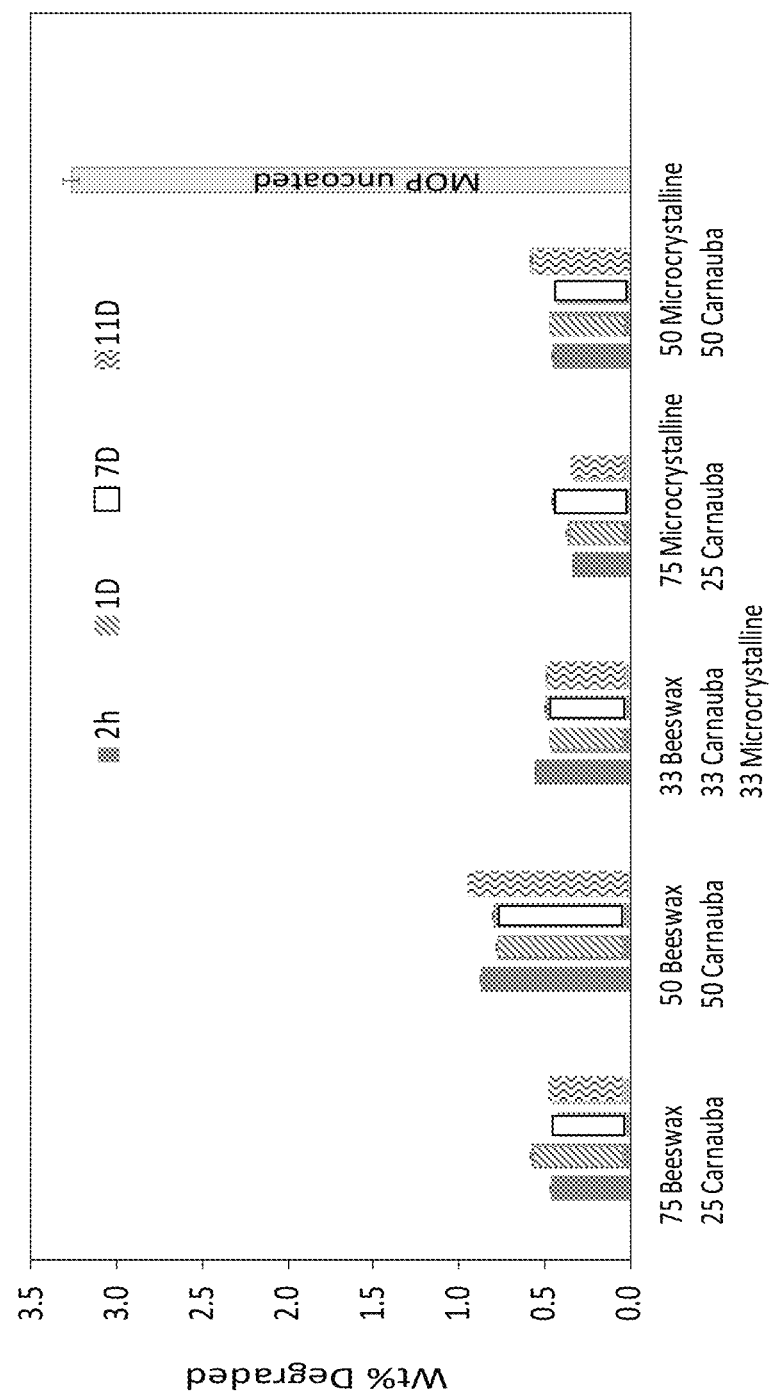
FIG. 8 is a chart comparing the abrasion resistance of the coated fertilizers according to embodiments of the present invention.

The percent degradation was calculated as the wt % of particles <250 micron remaining after a 10 g sample (+1-3.35 mm) was subjected to 30 s in a Spex-mixer/Mill (8000M) replicated in triplicate. Compared with the uncoated sample the % degraded was reduced by ~10 times for these coatings, as shown in FIG. 8.

EXAMPLE 5: PRODUCT DEGRADATION AND DUST FORMATION

Figure 9:
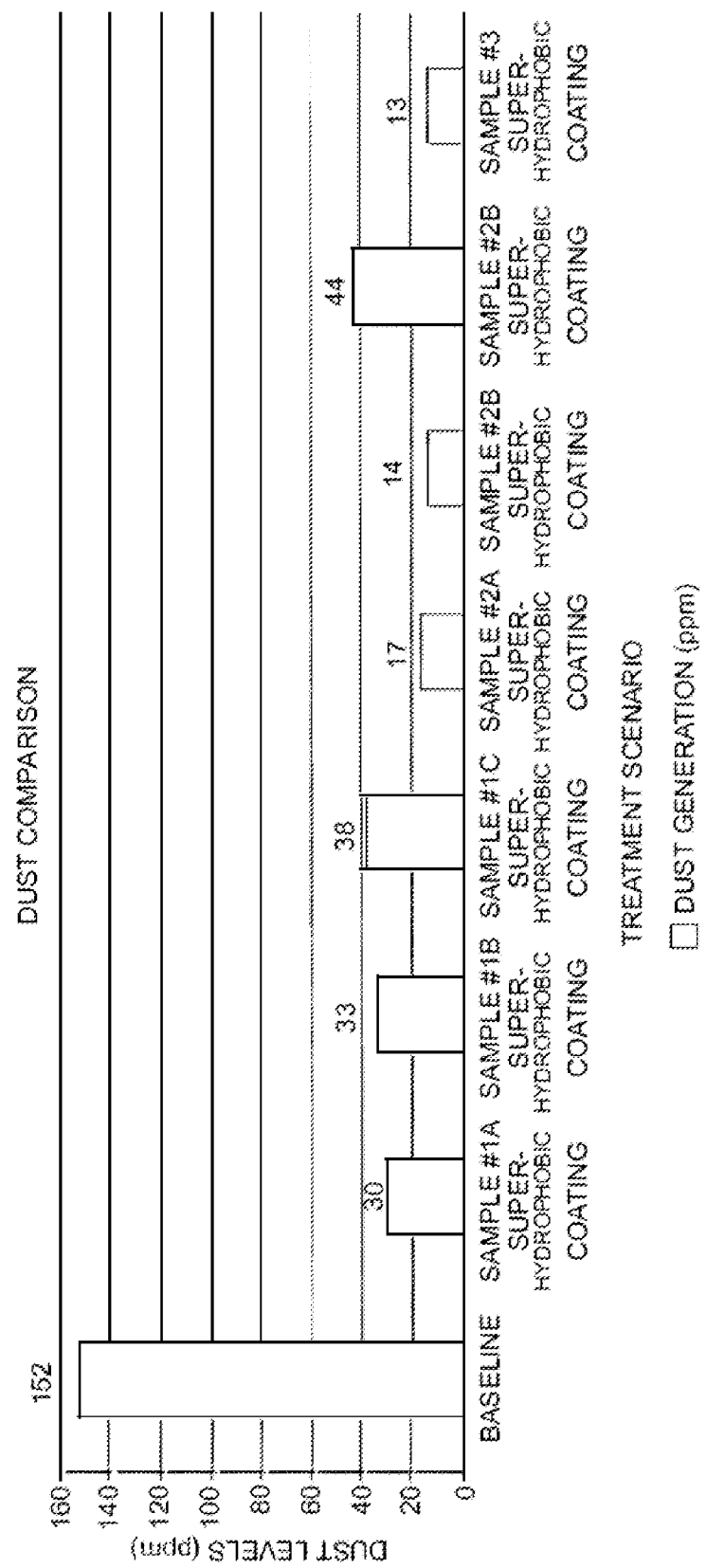
FIG. 9 is a chart comparing product dust of the coated fertilizers according to embodiments of the present invention.
Figure 10:
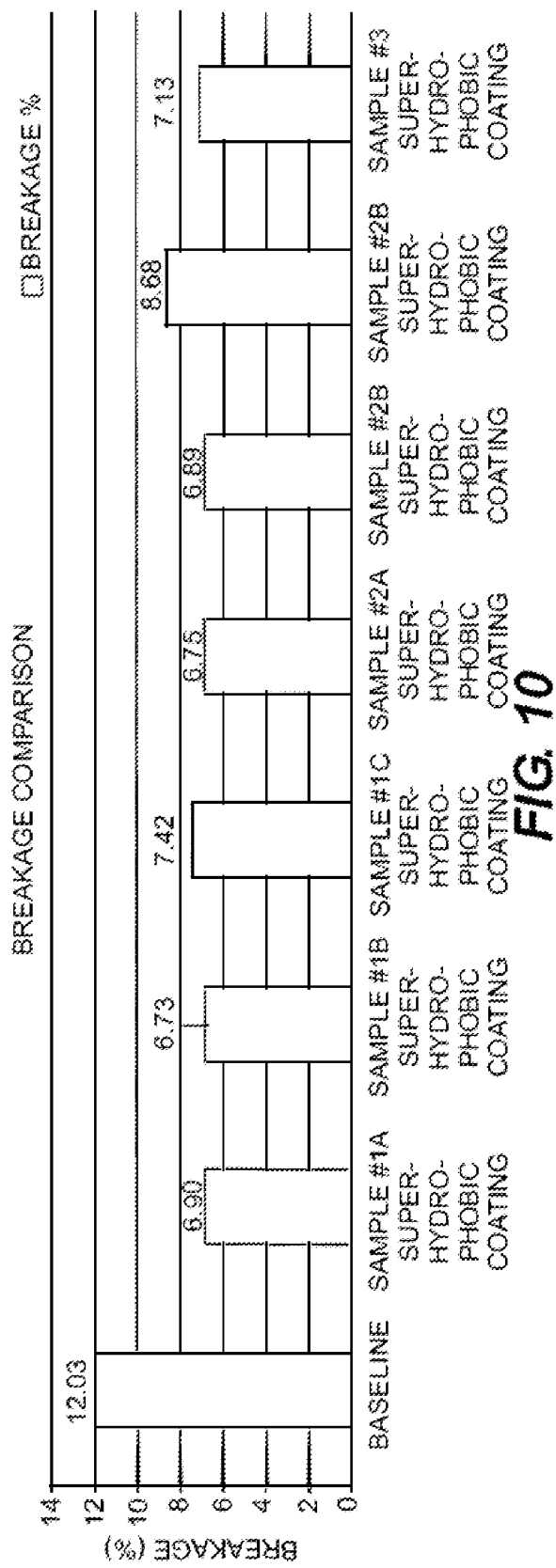
FIG. 10 is a chart comparing the product degradation of the coated fertilizers according to embodiments of the present invention.

Referring to FIGS. 9 and 10, the product degradation and dust formation was compared for samples with a moisture control coating as described herein compared to uncoated MOP. In the figures, Samples #1A-C and #2-C were coated with a roughener of sodium stearate at an amount of 2 lb of stearate per ton of fertilizer granules, and with a hydrophobic coating formed of VM160 petroleum oil with 5% amine at an amount of 3 lb of coating per ton of granules. Sample #3 was coated with the same roughener and hydrophobic coating formulas, but the roughener was increased to 3.5 lb/ton. As seen in the graphs, the dust generation and breakage percentage of the coated samples were significantly reduced compared to the uncoated baseline sample.

The invention may be embodied in other specific forms without departing from the essential attributes thereof; therefore, the illustrated embodiments should be considered in all respects as illustrative and not restrictive. The claims provided herein are to ensure adequacy of the present application for establishing foreign priority and for no other purpose.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What we claimed is:

1. A fertilizer product comprising a plurality of granules coated for moisture control, each of the coated granules comprising:
   a base fertilizer granule; and
   a moisture control coating applied to the base fertilizer granule, the coating including a hydrophobic material component and a roughening component,
   wherein the roughening component comprises particulates having a particle size in a range of from about 10 µm to about 150 µm so as to form a micron-scaled surface roughness on an outermost surface of the coated granules,
   wherein the hydrophobic material component comprises an oil selected from a group consisting of a mineral white oil, petroleum oil, canola oil, sunflower oil, soy oil, castor oil, linseed oil, olive oil, modified vegetable oils, and combinations thereof, and wherein the hydrophobic material is present in an amount of from about 0.5 to about 2.0 weight percent of the entire fertilizer granule.

2. The fertilizer product of claim 1, wherein the roughening component is present in an amount of from about 0.01 wt % to about 10 wt % based on a total weight of the granule.

3. The fertilizer product of claim 2, wherein the roughening component is present in an amount of from about 0.1 wt % to about 1.0 wt % percent of the total weight of the granule.

4. The fertilizer product of claim 1, wherein the roughening component has a solubility lower than the base fertilizer granule.

5. The fertilizer product of claim 1, wherein the roughening component is selected from a group consisting of silicates, sand, phosphate rock, calcium carbonate, gypsum, zinc, manganese, iron, copper, molybdenum, boron, chloride, cobalt, sodium, sulfur in a sulfate form, elemental sulfur, zinc stearate, sodium stearate, stearic acid, potash dust, and combinations thereof.

6. The fertilizer product of claim 1, wherein the base fertilizer granule is selected from the group consisting of nitrates, ureas, muriate of potash, sulfate of potash, monoammonium phosphate (MAP), diammonium phosphate (DAP), single superphosphate, triple superphosphate, potassium phosphates, calcium phosphates, and combinations thereof.

7. The fertilizer product of claim 1, wherein the moisture control coating comprises sodium stearate and/or zinc stearate as the roughening component, and wherein the hydrophobic material comprises petroleum oil with amine or candelilla wax.

8. A method of providing a moisture control treatment to fertilizer granules, the method comprising:
   providing a plurality of fertilizer granules; and
   coating the fertilizer granules with a moisture control treatment material comprising a hydrophobic material and a roughening component, wherein the roughening component comprises particulates having a particle size in a range of from about 10 µm to about 150 µm so as to form a micron-scaled surface roughness on an outermost surface of the coated granules, wherein the hydrophobic material component comprises an oil selected from a group consisting of a mineral white oil, petroleum oil, canola oil, sunflower oil, soy oil, castor oil, linseed oil, olive oil, modified vegetable oils, and combinations thereof, and wherein the hydrophobic material is present in an amount of from about 0.5 to about 2.0 weight percent of the entire fertilizer granule.

9. The method of claim 8, wherein the roughening component is present in an amount of from about 0.01 wt % to about 10 wt % based on a total weight of the granule.

10. The method of claim 9, wherein the roughening component is present in an amount of from about 0.1 wt % to about 1.0 wt % percent of the total weight of the granule.

11. The method of claim 8, wherein coating the fertilizer granules comprises:
   coating the fertilizer granules with the roughening component; and
   subsequently coating the fertilizer granules with the roughening component applied thereto with the hydrophobic material.

12. The method of claim 8, wherein coating the fertilizer granules comprises:
   combining the roughening component and the hydrophobic material; and
   subsequently coating the fertilizer granule with the combined roughening component and hydrophobic material.

13. The method of claim 8, wherein the roughening component is selected from a group consisting of silicates, sand, phosphate rock, calcium carbonate, gypsum, zinc, manganese, iron, copper, molybdenum, boron, chloride, cobalt, sodium, sulfur in a sulfate form, elemental sulfur, zinc stearate, sodium stearate, stearic acid, potash dust, and combinations thereof.

14. The method of claim 8, wherein the base fertilizer granule is selected from the group consisting of nitrates, ureas, muriate of potash, sulfate of potash, monoammonium phosphate (MAP), diammonium phosphate (DAP), single superphosphate, triple superphosphate, potassium phosphates, calcium phosphates, and combinations thereof.

15. The method of claim 8, wherein the moisture control coating comprises zinc stearate and/or sodium stearate as the roughening component, and wherein the hydrophobic material comprises petroleum oil with amine or candelilla wax.

16. A fertilizer product comprising a plurality of granules coated for moisture control, each of the coated granules comprising:
   a base fertilizer granule; and
   a moisture control coating applied to the base fertilizer granule, the coating including a hydrophobic material component and a roughening component, wherein the hydrophobic material is present in an amount of from about 0.5 to about 2.0 weight percent of the entire fertilizer granule,
   wherein the roughening component comprises particulates having a particle size in a range of from about 10 µm to about 150 µm so as to form a micron-scaled surface roughness on an outermost surface of the coated granules, and
   wherein the roughening component is present in an amount of from about 0.01 to about 10 weight percent of the fertilizer granules.

* * * * *